(12) United States Patent
Sioma

(10) Patent No.: US 9,570,933 B2
(45) Date of Patent: Feb. 14, 2017

(54) CHARGING SYSTEM HAVING ACTIVE ERROR CORRECTION FOR RECHARGEABLE BATTERIES

(71) Applicant: Edward M. Sioma, Levittown, PA (US)

(72) Inventor: Edward M. Sioma, Levittown, PA (US)

( * ) Notice: Subject to any disclaimer, the term of this patent is extended or adjusted under 35 U.S.C. 154(b) by 4 days.

(21) Appl. No.: 14/719,278

(22) Filed: May 21, 2015

(65) Prior Publication Data

US 2016/0344198 A1 Nov. 24, 2016

(51) Int. Cl.
*H02J 7/06* (2006.01)
*H02J 7/24* (2006.01)
*G01N 27/416* (2006.01)
*H02J 7/00* (2006.01)

(52) U.S. Cl.
CPC .............. *H02J 7/007* (2013.01); *H02J 7/0029* (2013.01); *H02J 7/0055* (2013.01); *H02J 2007/0037* (2013.01)

(58) Field of Classification Search
CPC ................................ H02J 7/007; H02J 7/0093
USPC .................................. 320/139, 163; 324/429
See application file for complete search history.

(56) References Cited

U.S. PATENT DOCUMENTS

| | | | | |
|---|---|---|---|---|
| 5,808,443 A | * | 9/1998 | Lundstrom | H01M 10/44 320/147 |
| 2005/0194933 A1 | * | 9/2005 | Arnold | H02J 7/0077 320/128 |
| 2009/0278489 A1 | * | 11/2009 | St-Jacques | H02J 7/0016 320/103 |

* cited by examiner

*Primary Examiner* — Richard Isla Rodas
*Assistant Examiner* — David V Henze-Gongola
(74) *Attorney, Agent, or Firm* — LaMorte & Associates, P.C.

(57) ABSTRACT

A recharging system for a battery. The internal resistance of the battery and its leads produce an error voltage when a charging current flows through the battery and the leads. The error voltage combines with the inherent battery voltage to produce an inflated voltage. A filtering circuit receives the inflated voltage. The filter circuit quantifies the error voltage. A subtractor circuit receives the inflated voltage and the error voltage. The subtractor circuit subtracts the error voltage from the inflated voltage to quantify the battery voltage. A voltage comparator is utilized to compare the battery voltage to a voltage set point. A switch is provided that is controlled by the voltage comparator. The switch receives the charging current and directs the charging current to the only while the voltage set point is greater than the battery voltage. Thus, the battery is recharged.

15 Claims, 2 Drawing Sheets

CHARGING SYSTEM HAVING ACTIVE ERROR CORRECTION FOR RECHARGEABLE BATTERIES

BACKGROUND OF THE INVENTION

1. Field of the Invention

In general, the present invention relates to systems and methods used to charge a rechargeable battery. More particularly, the present invention relates to recharging systems that actively monitor specified variables during a recharging cycle.

2. Prior Art Description

Rechargeable batteries come in many shapes and sizes. Small rechargeable batteries are used to power cell phones, toys, cordless tools and a large variety of everyday items. Large rechargeable batteries are used in cars, trucks, boats and the like. Even larger racks of rechargeable batteries are used to store power in electric vehicles, hybrid vehicles, commercial airliners, and many buildings that collect power using solar panels.

In order to charge a rechargeable battery, a current must be passed into the battery at a voltage that is greater than the output voltage rating of the battery. For example, in order to recharge a 12 volt battery, current must be supplied to the battery in excess of 12 volts. This voltage differential is required to ensure that electricity is flowing into the battery and not out of the battery. However, determining the best charging voltage for a particular battery or series of batteries is a complicated endeavor.

If a battery is overcharged, it can damage the battery and it can even catch fire. Battery fires due to overcharging have been reported in laptop computers, electric vehicles, and commercial aircraft, even though these applications use sophisticated systems to monitor the status of the rechargeable batteries. The reason for the batteries being overcharged is that prior art recharging systems are designed assuming that the battery and the wiring that leads to the battery have a low and constant resistance. In reality, this assumption is not true. Rechargeable batteries are not static systems. Rather, they are dynamic systems that vary in resistance in response to a variety of variables. For instance, the resistance of a rechargeable battery and its surrounding wiring is dependent upon the temperature of the battery, the age of the battery, the condition of the chemicals within the battery, port corrosion, and internal electrode degradation.

In the prior art, a conditioned DC power source is typically used to recharge a battery. The current is conditioned to a preselected charging voltage and charging current that is fed into the rechargeable battery. The output of the battery charger is monitored using a voltage comparator. The voltage comparator compares the output voltage of the battery charger to a preselected voltage set point. For example, a rechargeable battery may be nominally rated with an output voltage of 12.2 volts. The voltage set point for the comparator may be set at 13.8 volts. Thus, when the output voltage of the battery reaches 13.8 volts, the battery is deemed fully charged and the recharging voltage is stopped.

This prior art recharging methodology, assumes that the output voltage being received at the voltage comparator is exactly equal to the voltage output actually being produced by the rechargeable battery. This is a false assumption that creates significant problems. The wires that lead to and from the rechargeable battery have internal resistances. The battery itself has an internal resistance. The termination between the wires and the battery may be partially corroded and can provide significant resistance. In accordance with Ohm's law, when a current passes through a resistive element, a voltage is developed that varies as a function of the current times the value of the resistance. Consequently, the resistances of the wires, battery and contacts inflate the output voltage of the battery. The inflated voltage is read by the voltage comparator. The voltage comparator, therefore, believes that the battery is outputting more voltage than it actually is. The voltage comparator will, therefore, turn off the recharging current before the battery has become fully charged.

The difference between the inflated voltage and the real voltage of the battery is the error voltage. The recharging system is designed with a voltage set point at the comparator that can be compensated manually for a theoretical error voltage. However, the error voltage varies with time, temperature and battery degradation. Thus, the recharging system may overcharge the battery while attempting not to undercharge the battery. This is what often causes batteries to become overcharged and become damaged and perhaps catch fire.

A need therefore exists for a charging system for a rechargeable battery that dynamically monitors the voltage error inherent in the system. By adjusting the charging system as a function of the voltage error, the rechargeable battery can always be fully charged without the danger of overcharging the battery. This need is met by the present invention as described and claimed below.

SUMMARY OF THE INVENTION

The present invention is a recharging system for a rechargeable battery. A DC charging current is derived from either an AC power source or a DC power source. The rechargeable battery to be charged has a first voltage and an inherent internal resistance. Furthermore, the rechargeable battery is connected to leads. The leads have lead resistances. The internal resistance of the battery and the lead resistances produce a second error voltage when the DC charging current flows through the rechargeable battery and the leads. The second error voltage combines with the first battery voltage to produce an inflated voltage.

A filtering circuit is provided that receives the inflated voltage. The filter circuit quantifies the second error voltage.

A subtractor circuit is provided that receives the inflated voltage and the second error voltage after it is quantified. The subtractor circuit subtracts the second error voltage from the inflated voltage to quantify the first battery voltage.

A voltage comparator is utilized to compare the first battery voltage, after being quantified, to a voltage set point.

A switch is provided that is controlled by the voltage comparator. The switch receives the DC charging current and directs the DC charging current to the rechargeable battery when the voltage set point is greater than the first battery voltage. Thus, the rechargeable battery is recharged.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention recharging system assembly can be embodied in many ways to recharge a wide array of batteries, only two embodiments have been selected for the purposes of illustration and discussion. The embodiments represent two of the best modes contemplated for utilizing the invention. The illustrated embodiments, however, are merely exemplary and should not be considered limitations when interpreting the scope of the appended claims.

Figure 1:
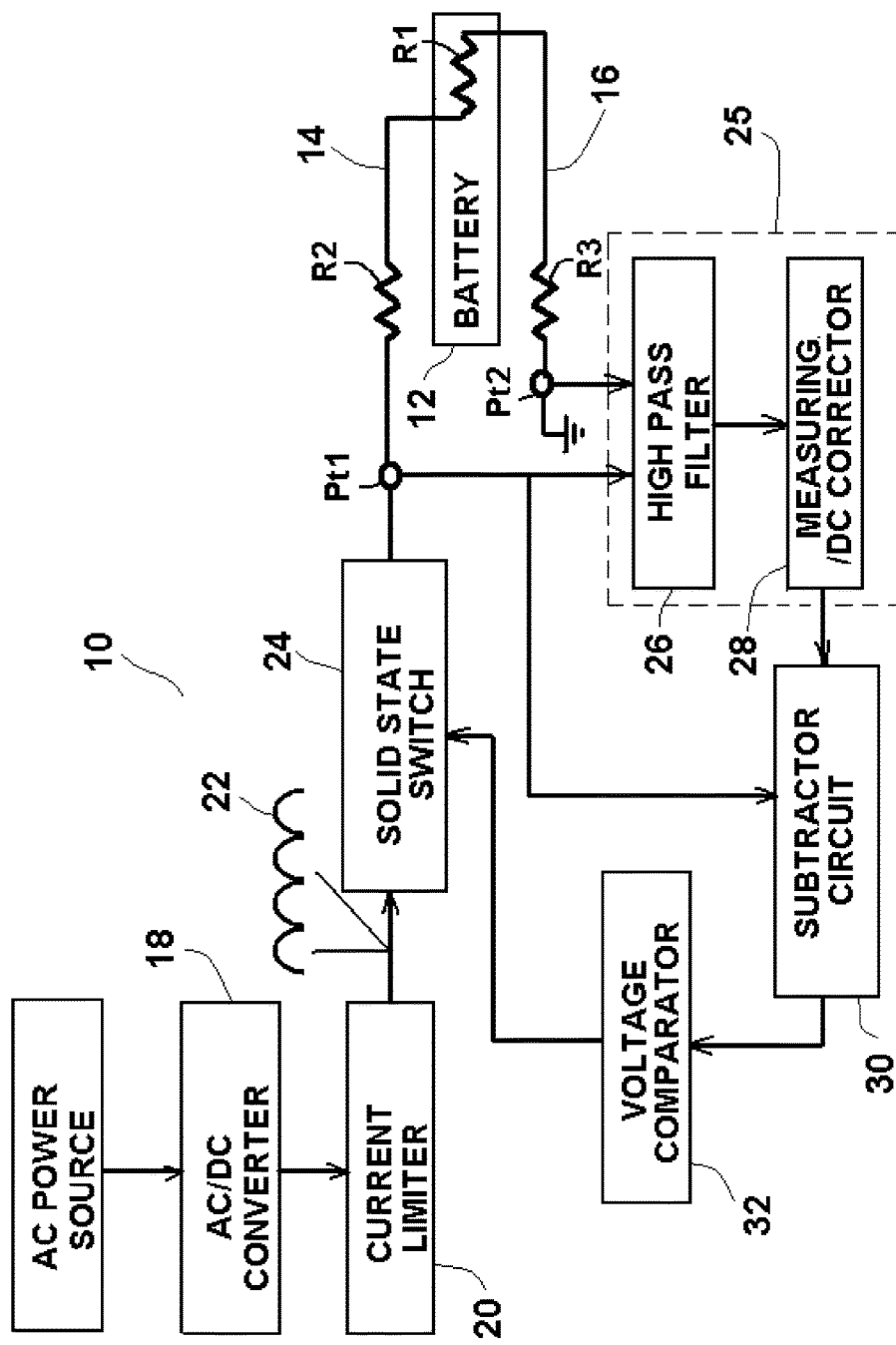
FIG. 1 is a block diagram schematic of an exemplary embodiment of the present invention recharging system shown with an AC power source.

Referring to FIG. 1, a recharging system 10 is shown coupled to a rechargeable battery 12. The rechargeable battery 12 is coupled to an incoming lead 14 and a ground lead 16. The rechargeable battery 12 has an internal resistance, shown as R1. The incoming lead 14 has an internal resistance and connector resistances that are represented by R2. Lastly, the ground lead 16 has internal resistance and connector resistances that are represented by R3. It will therefore be understood that the total resistance $R_{Total}$ of the rechargeable battery and its leads is equal to R1+R2+R3, as stated below $$R_{Total}=R1+R2+R3 \quad [\text{Equation 1}]$$

Using Ohm's law (V=IR), it will be understood that as current flows through the rechargeable battery 12 to recharge the battery 12, a voltage error ($V_{Error}$) is generated. The voltage error ($V_{Error}$) is equal to the incoming current (I) times the total resistance ($R_{Total}$).

$$V_{Error}=I \times R_{Total} \quad [\text{Equation 2}]$$

The true voltage ($V_{Battery}$) of the rechargeable battery 12 becomes inflated by the voltage error ($V_{Error}$). The inflated voltage ($V_{Inflated}$) is therefore equal to the true voltage ($V_{Battery}$) of the battery 12 plus the voltage error ($V_{Error}$).

$$V_{Inflated}=(V_{Battery})+(V_{Error}) \quad [\text{Equation 3}]$$

Rephrased, it will be understood that the Voltage error ($V_{Error}$) is the difference between the inflated voltage ($V_{Inflated}$) and the real battery voltage ($V_{Battery}$).

$$V_{Error}=V_{Inflated}-V_{Battery} \quad [\text{Equation 4}]$$

In FIG. 1, the power to charge the rechargeable battery 12 is assumed to come from the power grid of the local utility company. As such, the electricity supplied is initially AC. An AC/DC converter 18 is utilized to produce a modulated DC power signal. The modulated DC power signal passes through a current limiter 20, which limits the current and voltage of the modulated DC power signal to values appropriate for the power ratings of the battery 12 being recharged. This produces the DC charging current 22. The DC charging current 22 remains modulated. It will therefore be understood that the voltage of the DC charging current 22 varies between zero volts and its maximum voltage at the frequency rate of the initial AC signal. This modulation of the DC charging current 22 is important for the operation of the recharging system 10, as will be later explained.

The flow of the DC charging current 22 to the rechargeable battery 12 is controlled by a solid state switch 24. When the rechargeable battery 12 is fully charged, the solid state switch 24 turns off the DC charging current 22. Conversely, when the rechargeable battery 12 is undercharged, the solid state switch 24 turns on the DC charging current 22, enabling the DC charging current 22 to be received by the rechargeable battery 12.

In the illustrated embodiment, the rechargeable battery 12 and its leads exist between a first circuit point Pt1 and a second circuit point Pt2, which are on opposite sides of the rechargeable battery 12. The resistances of the rechargeable battery 12 and its leads 14, 16 produce the voltage error ($V_{Error}$). Accordingly, a measured voltage between the first circuit point Pt1 and the second circuit point Pt2 would equal the inflated voltage ($V_{Inflated}$), as defined by Equation 3.

A filter circuit 25 is provided. The filter circuit 25 includes a high pass filter 26. The high pass filter 26 receives the voltage inputs from both the first circuit point Pt1 and the second circuit point Pt2. The DC charging current 22 is a modulating signal. As such, its voltage varies with time. At times, when the DC charging current 22 has a voltage of zero, a voltage measured between circuit point Pt1 and circuit point Pt2 would be equal to the true battery voltage ($V_{Battery}$) alone, without the voltage error ($V_{Error}$). This is because in accordance with Equation 2, when the current (I) is set at zero, the voltage error ($V_{Error}$) is also zero. However, when the DC charging current 22 is at its maximum voltage, then the battery 12 is being recharged and the voltage between circuit point Pt1 and circuit point Pt2 equals the inflated voltage ($V_{Inflated}$), as defined by Equation 3. The inflated voltage ($V_{Inflated}$) is passed to the high pass filter 26. The high pass filter 26 blocks the DC components of the signal and only passes the AC portion of the signal.

The filter circuit 25 also includes a measuring/DC restorer 28. The AC portion of the signal is received by a measuring/DC restorer 28, which measures the voltage error ($V_{Error}$) and converts the AC signal components back into DC. The output of the measuring/DC restorer 28 is therefore equal to the voltage error ($V_{Error}$), as defined by Equation 4.

A subtractor circuit 30 is provided. The subtractor circuit 30 receives the battery voltage ($V_{Battery}$) plus the voltage error ($V_{Error}$) created by the inherent resistances ($R_{Total}$). The subtractor circuit 30 also receives the measured voltage error from the measuring/DC restorer circuit 28, which is equal to the voltage error ($V_{Error}$). The subtractor circuit 30 subtracts the measured voltage error ($V_{Error}$) from the inflated voltage ($V_{Inflated}$). In accordance with Equation 3, it will be understood that the inflated voltage ($V_{Inflated}$) is equal to the sum of the battery voltage ($V_{Battery}$) and the voltage error ($V_{Error}$). The voltage errors cancel and the result is a reading of just the true battery voltage ($V_{Battery}$) in accordance with Equation 5 below.

$$V_{Battery}=(V_{Inflated})-(V_{Error}) \quad [\text{Equation 5}]$$

The battery voltage ($V_{Battery}$) is accurate without regard to variables such as temperature, battery condition, resistances, and battery chemistry.

A voltage comparator 32 is provided. The voltage comparator 32 receives the correct battery voltage ($V_{Battery}$) and compares that correct battery voltage ($V_{Battery}$) to a voltage set point. The voltage comparator 32 operates the solid state switch 24. If the correct battery voltage ($V_{Battery}$) is below the voltage set point, then the solid state switch 24 enables the flow of the DC charging current 22 to the rechargeable battery 12. When the correct battery voltage ($V_{Battery}$) reaches the voltage set point, the solid states switch 24 stops the DC charging current 22.

The voltage error ($V_{Error}$) changes due to variables, such as temperature, time, residual charge level, battery chemistry and connector integrity. However, by determining the voltage error ($V_{Error}$) and subtracting that voltage error ($V_{Error}$) from the measured inflated voltage ($V_{Inflated}$), the correct battery voltage ($V_{Battery}$) produced by the rechargeable battery 12 can be accurately ascertained.

By compensating for the voltage error ($V_{Error}$) the rechargeable battery 12 can be recharged to the correct voltage. The correct voltage is dynamically calculated, therein preventing the rechargeable battery 12 from being either overcharged or undercharged. The dynamic control of the correct voltage used to recharge the battery 12 also enables partially charged batteries to be fully charged in an efficient manner.

Figure 2:
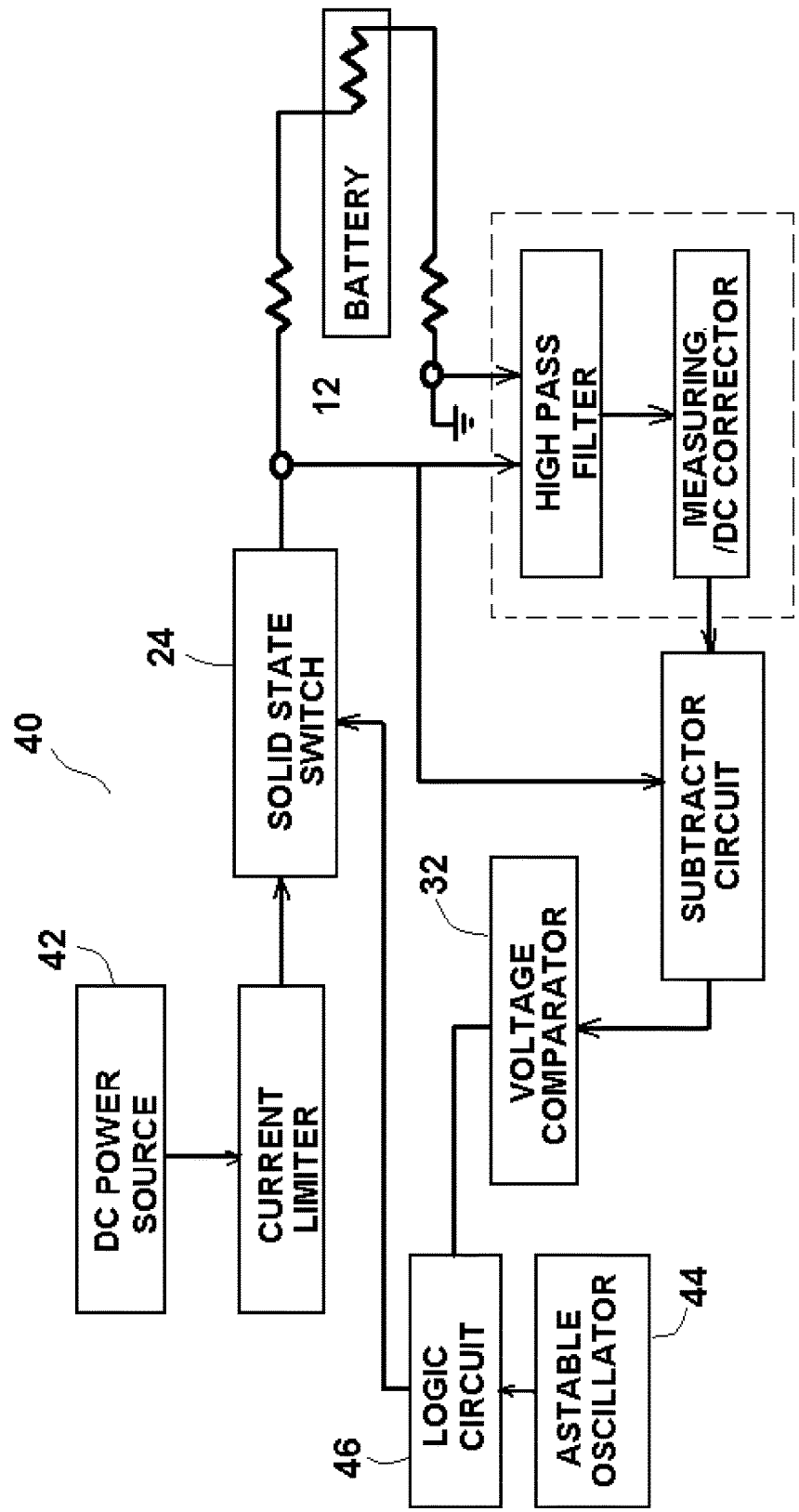
FIG. 2 is a block diagram schematic of an exemplary embodiment of the present invention recharging system shown with a DC power source.

As has been previously stated, when the DC charging current 22 has a voltage of zero, a voltage measured between circuit point Pt1 and circuit point Pt2 would be equal to the true battery voltage ($V_{Battery}$). This is because in accordance with Equation 2, when the current (I) is set at zero, the voltage error ($V_{Error}$) is also zero. However, the voltage error ($V_{Error}$) can only be determined when the DC charging current 22 is at its maximum voltage. For the recharging system 10 to operate, both the true battery voltage ($V_{Battery}$) and the voltage error ($V_{Error}$) must be calculated. This can be efficiently accomplished by modulating the DC charging current 22 between zero volts and its maximum voltage. In the system of FIG. 1, the DC charging current 22 is generated from an A/C power source. As such, modulation is inherent in the signal. However, if the initial power source is a DC power source, such as a solar panel array or a wind turbine, then modulation must be added to the system Referring to FIG. 2, a recharging system 40 is shown that is adapted for use with a DC power source 42, such as a solar panel. The recharging system 40 operates in much the same manner as the system previously described with reference to FIG. 1. As such, like parts will be identified with like reference numbers. The difference in the second embodiment is that the output of the voltage comparator 32 is modulated using an astable oscillator 44 and logic circuits 46 that pulse the output of the voltage comparator 32 in synchronization with the astable oscillator 44.

When the rechargeable battery 12 is charged, the voltage comparator 32 triggers the solid state switch 24 to an off state, in the same manner as is earlier described. The astable oscillator 44 and logic circuits 46 have no effect upon the solid state switch 24 when it is in its off state. However, when the rechargeable battery 12 needs recharging and the voltage comparator 32 triggers the solid state switch 24 to its on state, then the logic circuits 46 and astable oscillator 44 are simultaneously activated.

When the solid state switch 24 is triggered to its on state, the output of the voltage comparator 32 is pulsed. This causes the solid state switch 24 to turn on and off at the frequency set by the astable oscillator 44. The result is that the solid state switch modulates the DC signal being generated by the DC power source. The modulated signal is used as the DC charging current and the remainder of the recharging system operates in the same manner as was described for the earlier embodiment of FIG. 1.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A recharging system, comprising:
   a source of a DC charging current;
   a rechargeable battery that supplies a true battery voltage, said rechargeable battery having an internal resistance;
   a first circuit point that receives said DC charging current;
   an incoming lead that extends from said first circuit point to said rechargeable battery;
   a second circuit point;
   a ground lead that extends from said rechargeable battery to said second circuit point, wherein said incoming lead and said ground lead have lead resistances, wherein said internal resistance and said lead resistances produce an error voltage when said DC charging current flows through said rechargeable battery and said leads, wherein said error voltage combines with said true battery voltage to produce an inflated voltage at said second circuit point;
   a filtering circuit that receives both a first voltage input from said first circuit point and a second voltage input from said second circuit point, wherein said filtering circuit quantifies said error voltage utilizing said first voltage input and said second voltage input;
   a subtractor circuit that receives said inflated voltage and said error voltage after being quantified, wherein said subtractor circuit subtracts said error voltage from said inflated voltage to quantify said true battery voltage;
   a voltage comparator that compares said true battery voltage, after being quantified, to a voltage set point; and
   a switch, disposed between said source of a DC charging current and said first circuit point, that is controlled by said voltage comparator, wherein said switch receives said DC charging current and directs said DC charging current to said rechargeable battery should said voltage set point be greater than said true battery voltage.

2. The system according to claim 1, wherein said source of said DC charging current includes a converter for converting an AC power signal into said DC charging current.

3. The system according to claim 1, wherein said DC charging current has a modulated waveform with an AC component.

4. The system according to claim 3, wherein said filtering circuit includes a high pass filter that separates said AC component from said modulated waveform.

5. The system according to claim 4, wherein said filtering circuit further includes a DC corrector for converting said AC component into a DC signal.

6. The system according to claim 1, wherein said source of said DC charging current is a DC power source that produces an unmodulated waveform.

7. The system according to claim 6, further including a modulation circuit for modulating said unmodulated waveform.

8. A recharging system for a rechargeable battery having a battery voltage, comprising:
   a first circuit point;
   an input lead that connects said recharageable battery to said first circuit point;
   a second circuit point;
   a ground lead that connects said rechargeable battery to said second circuit point, wherein said input lead, said ground lead and said rechargeable battery have resistances that produce an error voltage during recharging, and wherein during recharging said rechargeable battery presents an inflated voltage which is a sum of said battery voltage and said error voltage;
   a supply that provides a DC charging current to said first circuit point, wherein said DC charging current modulates between zero and a maximum current;
   a filtering circuit that receives a first voltage input from said first circuit point and a second voltage input from said second circuit point, wherein said filtering circuit utilizes said first voltage input and said second voltage input to determine said battery voltage when said DC charging current is at zero current and determine said inflated voltage when said DC charging current is at said maximum current, wherein said filtering circuit quantifies said error voltage;

a subtractor circuit that receives said inflated voltage and said error voltage after being quantified, wherein said subtractor circuit subtracts said error voltage from said inflated voltage to quantify said battery voltage;

a voltage comparator that compares said battery voltage, after being quantified, to a voltage set point; and a switch, disposed between said supply and said first circuit point that is controlled by said voltage comparator, wherein said switch receives said DC charging current and directs said DC charging current to said first circuit point while said voltage set point is greater than said battery voltage.

9. The system according to claim 8, wherein said supply includes a converter for converting an AC power signal into said DC charging current.

10. The system according to claim 9, wherein said DC charging current has a waveform with an AC component.

11. The system according to claim 10, wherein said filtering circuit includes a high pass filter that separates said AC component from said waveform.

12. The system according to claim 11, wherein said filtering circuit further includes a DC corrector for converting said AC component into a DC signal.

13. The system according to claim 8, wherein said supply of said DC charging current includes a DC power source that produces an unmodulated waveform.

14. The system according to claim 13, further including a modulation circuit for modulating said unmodulated waveform and producing said DC charging current.

15. A method of recharging a rechargeable battery, comprising the steps of:
providing a rechargeable battery having leads that extend to a first circuit point and a second circuit points, wherein said rechargeable battery and said leads have resistances that produce an error voltage during recharging, wherein during recharging said rechargeable battery presents an inflated voltage which is a sum of said error voltage and a real voltage for said battery;
providing a DC charging current to said first circuit point, wherein said DC charging current modulates between zero and a maximum current;
providing a filtering circuit that receives a first voltage input from said first circuit point and a second voltage input from said second circuit point, wherein said filtering circuit reads said battery voltage when said DC charging current is at zero and reads said inflated voltage when said DC charging current is at said maximum current, wherein said filtering circuit quantifies said error voltage;
subtracting said error voltage from said inflated voltage to quantify said battery voltage;
comparing said battery voltage, after being quantified, to a voltage set point; and
directing said DC charging current to said rechargeable battery only while said voltage set point is greater than said battery voltage.

* * * * *